Dec. 11, 1934.    G. B. RODNEY    1,984,084
TIRE DEFLATION INDICATOR
Filed Aug. 19, 1933
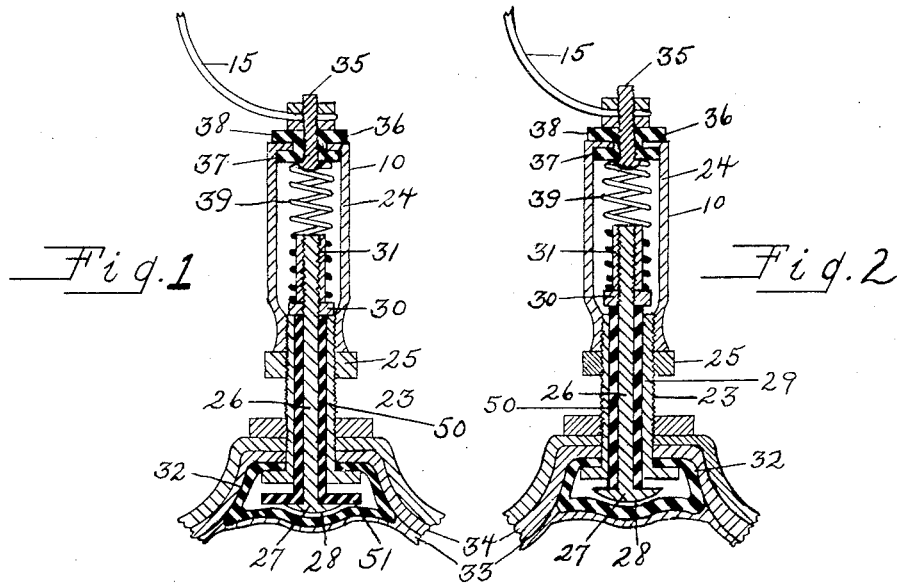
Inventor
George B. Rodney
By [signature]
Attorney Patented Dec. 11, 1934

1,984,084

UNITED STATES PATENT OFFICE 1,984,084

TIRE DEFLATION INDICATOR

George B. Rodney, Fayetteville, N. C.

Application August 19, 1933, Serial No. 685,889

2 Claims. (Cl. 200—58)

REISSUED (Granted under the act of March 3, 1883, as amended April 30, 1928; 370 O. G. 757)

This invention described herein may be manufactured and used by or for the Government for governmental purposes, without the payment to me of any royalty thereon.

This invention relates to a deflation indicator for pneumatic tired vehicles.

The principal object of the invention is to provide an apparatus for notifying the operator of the vehicle of the deflation of any tire below a predetermined pressure.

Many automobile accidents are caused by the deflation of a tire which so affects the control of the vehicle that it is practically impossible for the operator to hold the same on the road. It is not necessary that the deflation be instantaneous, as when a "blow-out" occurs, to cause a rapid skidding from the road bed, since a side drag will develop from a slow leak, and may become disastrous if the car is travelling at a high rate of speed. It is to prevent just such accidents that the applicant designed the apparatus which forms the subject matter of this application, for if the operator can be notified of the deflating of any one tire he can reduce his speed to prevent the unbalanced vehicle from being thrown from the road.

Briefly stated, my invention consists of pressure switches which are attached to each of the vehicle tires. These pressure switches operate with either deflation or inflation of the tire and when a predetermined pressure is reached, make circuits in which are connected indicating lights.

Having thus briefly described the invention, the same will now be described in detail and reference for this purpose will be had to the accompanying drawing in which corresponding parts are indicated by like reference numerals:

Fig. 1 is a sectional view of the pressure switches showing the central stem in the position caused by deflation of the tire;

Fig. 2 is a similar view to Fig. 1 showing a slightly modified form adaptable to also indicate over inflation. In this figure the central stem is shown in a position corresponding to normal inflation of the tire.

The detail construction of the pressure switch, particularly that type which functions only with deflation of the tire as shown in Fig. 1, will now be considered. This switch is composed of the following members: An outer main stem (23) which is cylindrical in form and flanged at its lower extremity, the cylindrical portion is threaded externally for the reception of the adjustable metallic cap (24) and the lock nut (25) for retaining cap (24) in any desired position.

Slidably mounted within the main stem (23) is fitted the plunger (26) which is made of brass or any other suitable conducting metal. This plunger (26) is solid and of circular cross-section and terminates at its lower extremity into a disc (27) having a lower spherical surface (28). It will be noted in Fig. 1 that the exterior surface of the plunger (26) and the upper surface of the disc (27) is provided with a cover (29), comprising a cylindrical portion (50) and a flange (51). This cover is composed of suitable insulating material to prevent grounding. The insulating cover (29) which forms a tube around the stem extends only a short distance above the main stem (23) and from this point to the upper end; the central stem (26) is threaded for the reception of the adjustable contact nut (30) and the internally threaded bushing (31). The flange of the main stem (23) and the central stem disc (27) are enclosed by a rubber cover (32) in order to protect the inner tube (33) of the tire (34) from coming in contact with the metal parts.

The top of the adjustable cap (24) is drilled for the reception of a contact terminal (35) which is insulated from the cap by the insulator (36) comprising a flanged cylindrical member (37) and a centrally drilled disc (38).

Surrounding the bushing (31) and connected to the insulated terminal (35) and abutting the adjustable contact nut (30) is a helical spring (39) which tends to force the central plunger outward against the resistance of the air pressure in the inner tube of the tire. On deflation of the tire the spring overcomes the decreased resistance and moves the plunger radially inward, until the adjustable contact nut (30) abuts the top of the main stem (23). Since the main stem (23) is grounded through the rim the contact between the nut (30) and the main stem (23) establishes a circuit to the indicator, the current passing through the spring (39), terminal (35), conductor (15), through other suitable conductors to the indicator located on the instrument panel. Neither the last mentioned conductor nor the indicating instrument are shown in the drawing, since no novelty of construction or operation resides in this supplementary apparatus.

In the operation of the entire device the deflation of any tire causes the particular pressure switch to function and thus establishes a circuit to the particular signal device on the instrument board to indicate the location of the deflating tire.

The indicating instrument may consist of a battery of lights which are illuminated coincident with the deflation of the tires. Thus if the right front tire deflates below a predetermined amount, say 20 pounds, a particular light will glow; the position of the light determining the location of the deflating tire. Instead of a light indicator, an electro-magnetically operated pointer indicator may be used or any convenient type suitable for location on the instrument board.

Setting the device for operation at any predetermined pressure is extremely simple; for example, suppose the normal pressure of the tires is thirty pounds and it is desired that the signal operate when the tires are deflated to a pressure of twenty pounds. The method of procedure is as follows: Inflate all tires to a pressure of twenty pounds then screw down each of the caps (24) until the signal operates, lock the cap at this height by turning the lock nut (25) tight against the bottom of the cap and then proceed with the inflation of the tires up to the required thirty pounds of pressure. As soon as the tires are further inflated the operation of the signal will cease and it will not operate again until the tires are deflated to twenty pounds pressure.

Although the primary object of the invention is to indicate deflation of any tire, a modified form of the device may be constructed which will also indicate over inflation. The modification consists in eliminating the flange (51) from the cover (29) as shown in Fig. 2. When this flange is omitted over inflation causes the pressure within the tire tube (34) to raise the plunger (26) until the top of the disc (27) touches the lower surface of the flanged extremity of the main stem (23), making a circuit through the grounded main stem (23) to the indicator, as described above.

It is obvious that those skilled in the art may vary the details of construction and arrangement of parts without departing from the scope and spirit of the invention, and therefore it is not desired to be limited to the foregoing description except as may be required by the claims.

Having described my invention, what I claim as new and wish to secure by Letters Patent is:

1. In an electrically operated tire pressure indicator for vehicles having a metallic frame, a pressure responsive switch operatively connected in a circuit including an indicating apparatus, said switch comprising a cylindrical main stem having a flanged extremity and grounded to the frame; a central plunger comprising a stem, threaded at its upper extremity for the reception of an adjustable contact nut, said contact nut having a flanged extremity adapted to serve as an electrical contact surface in conjunction with the upper extremity of the main stem, a cylindrical insulating sheath surrounding the unthreaded portion of the plunger stem and slidably mounted within said main stem, the stem of the plunger terminating at its lower end in a disc, said sheath extending at its lower extremity to cover the upper surface of the plunger disc to insulate the upper surface of said disc from the lower surface of the flange, a cap adjustably fitted to the main stem, and means for retaining said cap in any predetermined position along said stem, a spring interposed between the flange of the contact nut and the top of the cap, and an insulated terminal fitted in the top of said cap conductively connecting said spring to the aforesaid circuit.

2. In an electrically operated tire pressure indicator for vehicles having a metallic frame, a pressure responsive switch operatively connected in a circuit including an indicating apparatus, said switch comprising a cylindrical main stem having a flanged extremity and grounded to the frame; a central plunger comprising a stem, threaded at its upper extremity for the reception of an adjustable contact nut, said contact nut having a flanged extremity adapted to serve as an electrical contact surface in conjunction with the upper extremity of the main stem, a cylindrical insulating sheath surrounding the unthreaded portion of the plunger stem and slidably mounted within said main stem, the stem of the plunger terminating at its lower end in a disc of greater diameter than the insulating sheath, the upper surface of said disc and the lower surface of the flange of the main stem serving as contact surfaces in the circuit of the indicating apparatus, a cap adjustably fitted to the main stem, and means for retaining said cap in any predetermined position along said stem, a spring interposed between the flange of the contact nut and the top of the cap to react against the plunger, the compressive resistance of said spring depending on the adjustment of the cap, and an insulated terminal fitted in the top of said cap conductively connecting said spring to the aforesaid circuit.

GEORGE B. RODNEY.